United States Patent

[11] 3,573,586

[72] Inventor Arthur K. Littwin
 6555 LeMai, Lincolnwood, Ill. 60646
[21] Appl. No. 779,103
[22] Filed Nov. 26, 1968
[45] Patented Apr. 6, 1971
 Continuation-in-part of application Ser. No. 455,564, May 13, 1965, now abandoned.

[54] SERVO CONTROL FOR MOVEMENT OF A DEVICE THROUGH SUCCESSIVE STEPS
 4 Claims, 8 Drawing Figs.
[52] U.S. Cl. .................................................. 318/579, 318/657
[51] Int. Cl. ..................................................... G05b 19/36
[50] Field of Search ............................................ 318/20.165, 20.715, 20.255

[56] References Cited
UNITED STATES PATENTS

| | | | |
|---|---|---|---|
| 3,045,165 | 7/1962 | Littwin .......................... | 318/286 |
| 1,998,939 | 4/1935 | Mittag ........................... | 318/(20.165X) |
| 2,794,971 | 6/1957 | Hornfeck ....................... | 318/(20.715X) |
| 2,867,759 | 1/1959 | Comstock ...................... | 318/(20.255X) |
| 2,885,618 | 5/1959 | Belsterling ..................... | 318/(20.165X) |
| 3,039,035 | 6/1962 | Rudolf, Jr. et al. ............. | 318/(20.165) |
| 3,136,936 | 6/1964 | Eisengrein ..................... | 318/(20.165) |
| 3,174,089 | 3/1965 | Hawkins et al. ............... | 318/(20.165) |

Primary Examiner—T. E. Lynch
Attorney—Paul H. Gallagher

ABSTRACT: Electrical control apparatus for controlling the movement of a machine tool part, such as a grinding wheel; the machine tool has internal mechanism and controls for advancing the grinding wheel, and the present apparatus includes presettable induction means responsive to the advancing movement for controlling that movement the predetermine a definite maximum range of movement and establish a series of steps within that range; the steps can be of any desired extent independent of the extent of the maximum range, and need not be equal divisions of that range; e.g., if nine one-thousandths inch of material is to be removed from a workpiece by the grinding wheel, the apparatus may be preset to automatically remove four increments of two one-thousandths inch each and a final increment of one one-thousandths inch.

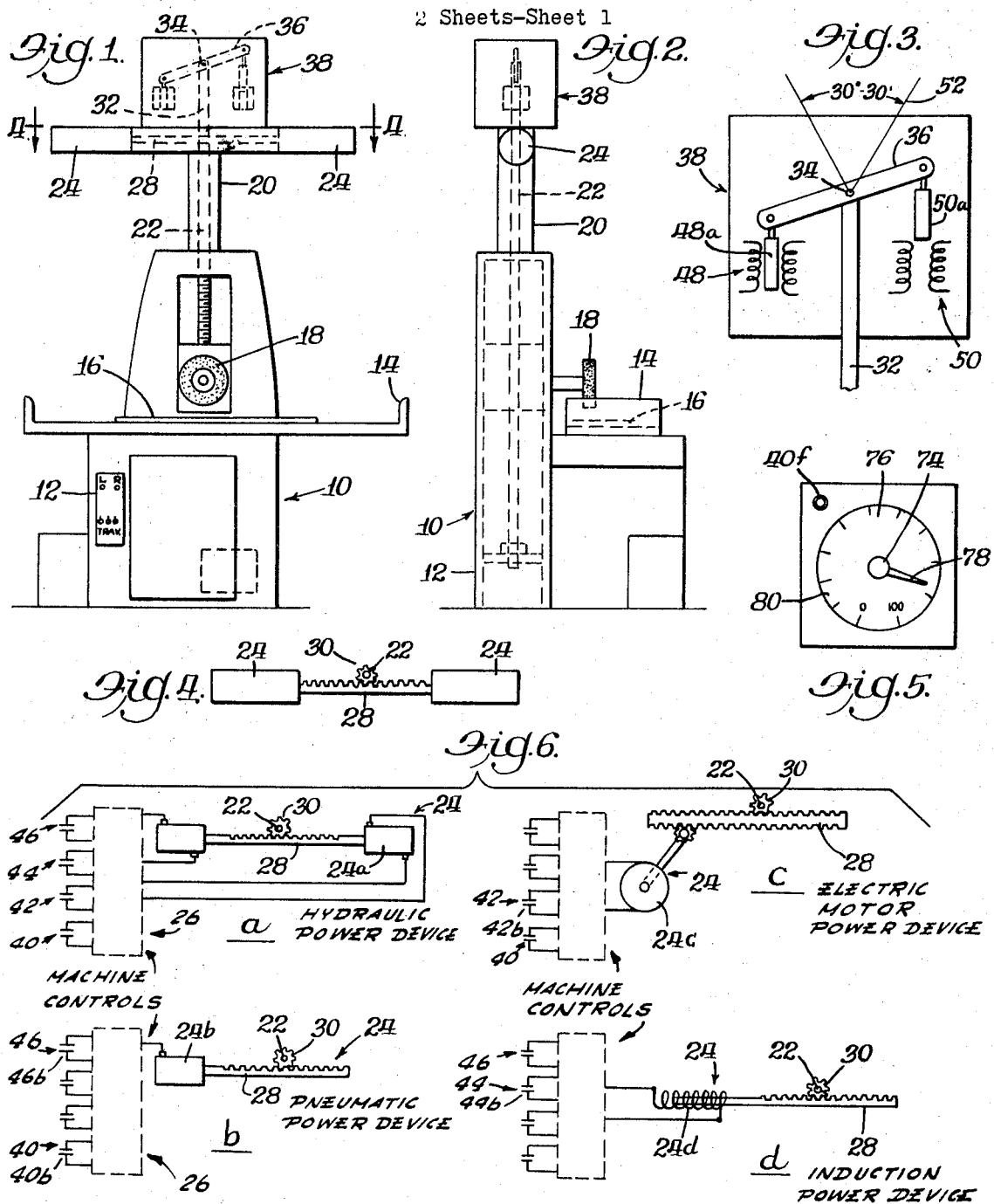

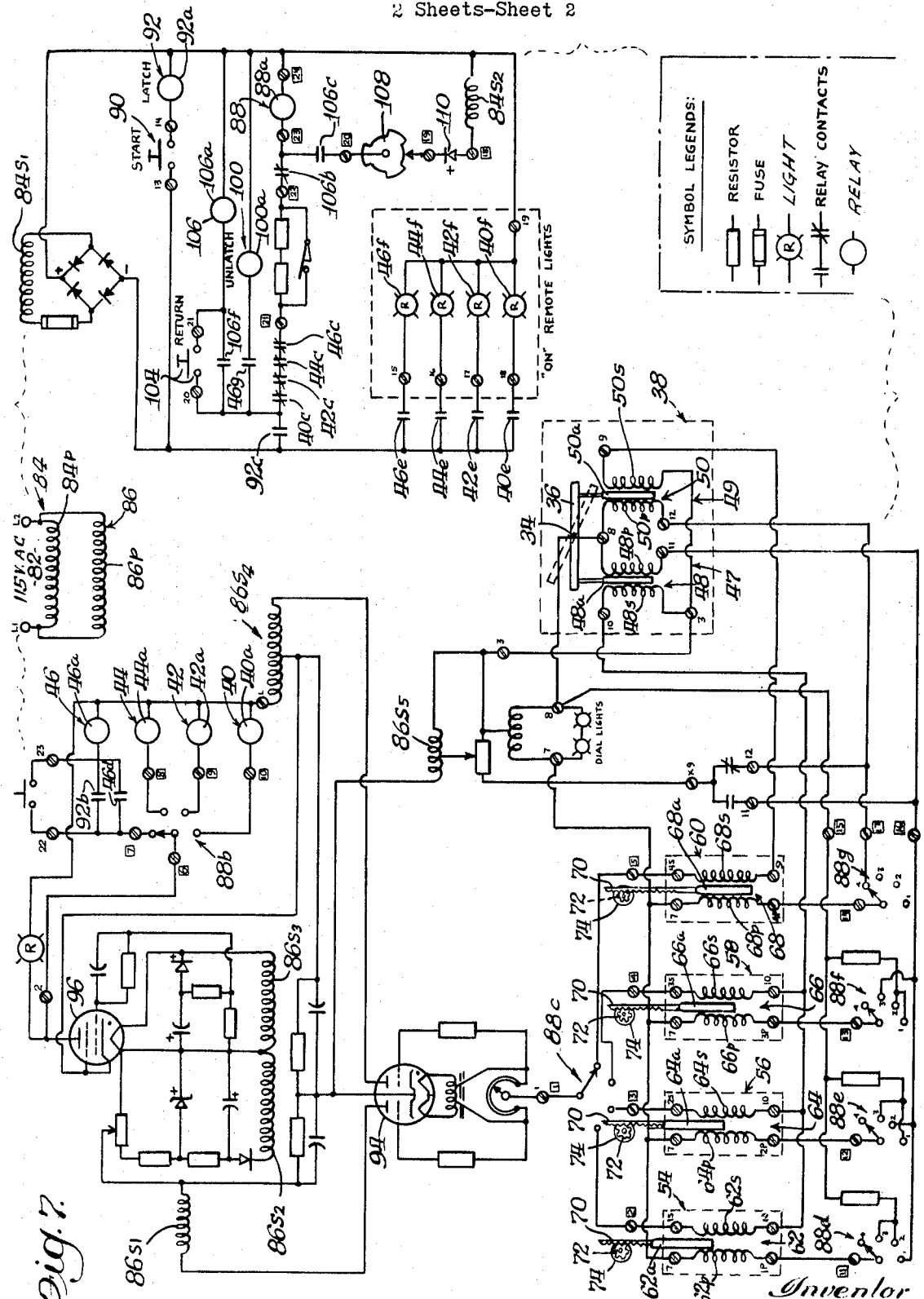

SERVO CONTROL FOR MOVEMENT OF A DEVICE THROUGH SUCCESSIVE STEPS

This application is a continuation-in-part of my copending application, Ser. No. 455,564, Filed May 13, 1965.

The present invention relates to movement control apparatus.

The invention is adapted particularly to controlling the movement of a movable part that is advanced progressively, and more particularly to the control of such a moving part throughout a predetermined cycle in which the movable part has a plurality of ranges of movement.

The invention finds particular adaptability to use in conjunction with machine tools. For example, in the case of a grinder a workpiece to be ground is placed on a table which is reciprocated for carrying the workpiece relative to a grinding wheel. In such a grinder the wheel may be advanced toward the workpiece to grind several layers or thicknesses from the workpiece. In an early part of the grinding operation the grinding wheel may be positioned for removing material from the workpiece of a certain thickness, and in a later part of the operation to remove material of a lesser thickness, and in still later portions of the cycle to remove portions of progressively less thickness, so that as the workpiece gradually assumes its final condition, the fact that progressively lesser amounts of material are removed therefrom in each pass enables it to be ground to an extremely accurate size.

A broad object of the present invention is to provide control apparatus for automatically controlling the advancing movements of a movable part of a machine in a plurality of ranges of operation thereof.

Another object is to provide control apparatus of the foregoing character capable of being set in infinitesimal increments as to the point at which it performs the intended controlling operation.

A further object is to provide control apparatus of the foregoing general character which is readily adaptable to incorporation in other controls of a machine.

A still further object is to provide control apparatus of the foregoing general character adapted for controlling a machine having a movable part that is advanced in predetermined increments, which is capable of predetermining a range of advancement of that part and wherein the advancement of the part is terminated at the end of that range notwithstanding coincidence or noncoincidence of the range with a whole-number multiple of the increments making up the range.

A still further object is to provide a novel method of controlling the movement of a movable part in a machine.

Other objects and advantages of the invention will appear from the following detail description taken in conjunction with the accompanying drawings wherein:

FIG. 1 is a front view of a machine of a character to which the control apparatus of the present invention is particularly adaptable, this view showing certain parts in semidiagrammatic form;

FIG. 2 is a side view of the apparatus of FIG. 1;

FIG. 3 is a large scale view of the upper part of the machine of FIGS. 1 and 2, oriented according to FIG. 1, and showing a unit containing certain elements of the apparatus of the present invention;

FIG. 4 is a view taken at line 4—4 of FIG. 1;

FIG. 5 is a face view of one of dials and control elements of the apparatus of the invention;

FIG. 6 is a diagrammatic view showing a plurality of forms of mechanism whereby operative association is established between the apparatus of the present invention and the machine of FIGS. 1 and 2;

FIG. 7 is a diagram of the electrical circuit of the apparatus of the invention; and FIG. 8 is a diagram indicating adjustable ranges of movement of the movable part of the machine.

Referring now in detail to the accompanying drawings attention is directed first to FIGS. 1 and 2 showing a machine to which the present invention is particularly adaptable. This machine, indicated in its entirety at 10, is a grinder which is representative of a wide variety of machines to which the invention may be applied. The grinder 10 includes a stand 12 and a reciprocating table 14 on which is placed a workpiece 16 on which work is to be done, in this case ground by a grinding wheel 18 incorporated in the machine. The table 14 is reciprocated transversely, in the plane of the paper, by suitable drive means such as a motor 19 as in my prior U.S. Pat. No. 3,247,434, dated Apr. 19, 1966, and is controlled in its reversing operations preferably by apparatus disclosed and claimed in my prior U.S. Pat. No. 3,045,165 dated Jul. 17, 1962, and put out by Electro-Matic Products Co. of Chicago. As the table is reciprocated the grinding wheel 18 is lowered into engagement with the workpiece and upon rotation thereof it performs the grinding operation thereon. The grinding wheel 18 is mounted for movement transversely across the workpiece so as to fully grind the upper surface thereof when the workpiece is wider than the thickness or axial dimension of the grinding wheel, as viewed in FIG. 2. After each movement of the workpiece in one direction, the grinding wheel is moved transversely thereof one increment corresponding to the thickness of the grinding wheel, until the entire surface of the workpiece is ground. The reciprocation of the grinding wheel transversely of the workpiece may similarly be controlled by the same kind of control means utilized for controlling the table, of my prior U.S. Pat. No. 3,045,165, referred to above.

The grinding wheel 18 of course is mounted for vertical movements for bringing it into and out of grinding engagement with the workpiece. Moreover the grinder includes controls for progressively moving the grinding wheel toward the workpiece as increments of the workpiece are removed so as to produce a fine and accurate finish thereon. It is particularly in connection with the latter advancements of the grinding wheel that the control apparatus of the present invention is utilized.

The grinder 10 is of known-type and in the normal use thereof the grinding wheel 18 is manually set preliminarily in a position in which, for example, it engages the workpiece. Then the machine is put into automatic operation wherein the wheel is advanced in small increments according to the thickness of the material to be removed from the workpiece. The grinding wheel is carried by a vertical member or post 20 movable vertically in rough adjustment movements to initially position the grinding wheel as stated above. After it is so positioned, it is locked in that position and the machine then turned on to perform its normal operation. The post 20 includes means, which may be for example a screw 22, which upon turning relative to the locked position of the post, carries the grinding wheel 18 downwardly in the desired small increments. This screw may be turned by any suitable means such as indicated at 24 in FIG. 6 under the control of machine controls which are designated herein generally at 26, these controls being provided as standard items with the machine. These controls as such do not enter into the present invention, the principal consideration being that due to the inherent law of operation of the machine, the screw 22 is turned and the grinding wheel lowered progressively as the machine continues to operate, the device of the present invention acting through the controls 26 as described hereinbelow.

In FIG. 6a, the power device 24 is a double-acting hydraulic power device 24a; in FIG. 6b a pneumatic device 24b; in FIG. 6c an electric motor device 24c; and in FIG. 6d an induction device 24d. In each case, the power device includes a motor, a rack 28 driven thereby, and a pinion 30 driven by the rack. The pinion is mounted on the screw 22 and upon rotation of the pinion, the screw is rotated which in turn advances the grinding wheel downwardly. Regardless of the form of the power device utilized, the controls of the present invention act in the same manner through the machine controls 26.

The apparatus of the present invention includes a component responsive to the lowering movements of the grinding wheel, which may be connected with the machine in any desired manner so as to be actuated in a manner corresponding to the lowering or advancing movements of the grinding wheel 18. One such connection may include a shaft 32 driven by the screw 22 and having operative connection, as through miter gears, with another shaft 34 on which is mounted a beam or arm 36 mounted for certain movements as described hereinbelow. The beam 36 is included in a unit designated generally at 38 (FIG. 1) which is mounted in any suitable location such as atop the post 20 of the machine to be controlled. This component 38 will be found in the diagram of FIG. 7 (lower right), which also includes the shaft 34 and beam 36. The unit or component 38 may be designated a traverse control.

The controls 26 incorporated in the grinder include for example a series of contacts incorporated in relays identified at 40, 42, 44, 46, the coils of which are found in the circuit of FIG. 7 (top center) and identified $40a$, $42a$, and $44a$, and $46a$, the contacts operated by the coils being identified $40b$, $42b$, $44b$, and $46b$ (FIG. 6). The sequence of operation of these relays will be described in detail hereinbelow.

The traverse control means 38 is similar in function to the corresponding component of my prior U.S. Pat. No. 3,045,165 referred to above, namely that at the lower end of FIG. 3 of that patent. This traverse control 38 includes two control units 47 and 49, having pairs of inductive coils 48, 50, the coils including primaries $48p$ and $50p$ and secondaries $48s$ and $50s$. Associated with the coils are armatures $48a$ and $50a$ pivotally secured to respective ends of the beam 36. Upon operation of the beam 36 the armatures are projected into and withdrawn from the coils respectively, varying the inductance of those coils with results referred to hereinbelow. The normal range of oscillation of the beam 36 is contained within such limits as to project the armatures into the coils or withdraw them therefrom within the range of vertical movement of the grinding head, such range of oscillation being in this case 33° 30', as indicated by the angle 52 (FIG. 3).

The control units 47 and 49 in the traverse control means 38 are arranged for directly controlling a series of individual control units 54, 56, 58 and 60. In the latter units are pairs of inductive coils 62, 64, 66, and 68 respectively, having primaries and secondaries identified with the same numerals and letters $p$ and $s$ respectively, and armatures identified with the corresponding numerals and the subscript $a$. The armatures are connected with rods 70 which may be racks meshing with pinions 72, or equivalent devices. The pinions 72 are manually operated by control knobs 74 which upon turning thereof are operative for actuating the racks 70 and projecting the corresponding armatures into the respective pairs of coils, or withdrawing them therefrom, with consequent variation in the inductance of the coils and the coupling between those coils and the coils of the unit 38. The knobs 74 are preferably associated with the individual dials 76 (FIG. 5) and provided with pointers 78 sweeping over calibrated scales 80.

The circuit of FIG. 7 is adapted for connection with a suitable AC source as at 82, and includes a transformer 84 having a primary $84p$ and secondaries $84s_1$ and $84s_2$. The line connection also includes a transformer 86 including a primary $86p$ and secondaries $86s_1$, $86s_2$, $86s_3$, and $86s_4$. The circuit includes a stepping switch 88 having a rotor $88a$ (center, right) and a series of switches $88b$, (top center) $88c$(center left) $88d$, $88e$, $88f$, and $88g$ (lower, left).

The circuit of FIG. 7 shows the OFF position with the switch $88b$ (top) in the 04 or OFF position. The operator, to start the machine, closes the START switch 90 (top, right) switch energizes a coil $92a$ (top, right) of a latch relay 92 of known kind which, upon energization thereof, latches in that condition until deenergized and unlatched. Upon energization, the coil closes contacts $92b$ (top) which energizes coil $46a$ and this coil is held in energized position by holding contacts $46d$. The energization of the coil $92a$ also closes contacts $92c$ (upper, right) which advances the rotor $88a$ one step, which steps the switch $88b$ one step to the 01 position which in turn energizes the coil $40a$ and opens contacts $40c$ (upper, right) deenergizing the rotor $88a$. The energization of the stepping switch 88 advances all of the outer stages thereof, including the switches $88c$ (center, left) and $88d$ (bottom, left) which throw the control unit 54 (lower, left) into circuit.

The armature $62a$ of the unit 54 is preset downwardly into the induction coils 62 a predetermined amount of described hereinbelow. This provides a positive bias on an amplifier tube 94 which maintains a positive bias on a tube 96 which then remains conducting and so long as it conducts, it retains the relay 40 in energized condition, with results as described in detail hereinbelow in the operation of the grinder. A plurality of contacts $40e$, $42e$, and $46e$, (center, right) are included in the similarly numbered relays to indicate energization igniting signal lights $40f$, $42f$, $44f$, and $46f$ respectively to indicate energization of the corresponding relays.

The traverse control means 38 assumes a normal position in which the beam 36 is in the dot-dash line position (FIG. 7) with the armature $48a$ relatively withdrawn from its coils and the armature $50a$ relatively projected into its coils. A suitable spring may be utilized for so biasing the beam. Upon normal operation of the grinder, the beam 36 is gradually swung in counterclockwise direction, as viewed in FIG. 7, progressively projecting the armature $48a$ into its coils and withdrawing the armature $50a$ from its coils as indicated above, through the shafts 32 and 34, by moving means inherent in the machine. The coils 48 are arranged for imposing negative bias on the tubes 94, 96 and progressively more so as the armature $48a$ is projected thereinto. When this negative bias reaches the value of the positive bias provided in the unit 54 it counteracts that positive bias and shuts the tube 96 off. This deenergizes the relay 40, and the contacts $40c$ (upper, right) having been held open, now permitted to close which energizes the stepping switch 88, then advancing the switch to the 02 position.

When the stepping switch is in the 02 position, the control unit 56 (lower, left) is in circuit and becomes energized, placing positive bias again on the tubes and energizing the relay 42. This opens the contacts $42c$ (upper, right) and again deenergizes the stepping switch 88, the with switch remaining in such position until again advanced upon energization by the next control unit 58.

The armature $64a$ of the control unit 56 is advanced farther into its induction coils than is the armature $62a$ of the previous control unit whereby additional positive bias is provided by that unit relative to unit 54, and greater than the negative bias produced by the control unit 47 in its then position, for rendering the tubes conducting. Further advancement of the armature $48a$ in the unit 47 into its coil 48 then progressively increases the negative bias provided on the tubes and shuts them as described above. This sequence is repeated in connection with the third control unit 58, it being understood that the armature $66a$ thereof advanced further into its induction coils than is the previous armature $64a$.

After deactivation of the third and final control unit 58, the relay 44 is deenergized, enabling the contacts $44c$ (upper, right) to close and energize the stepping switch 88, advancing it to the 04 position. This energizes the relay 46, the contacts $92b$ having been retained closed by the latch relay 92 (top, right). The relay 46 holds the contacts $46c$ (upper, right) open, preventing advancement of the stepping switch 88. The relay 46 closes its holding contacts $46b$ and closes contacts $46g$ (upper, right) which energizes an unlatching relay 100 which then unlatches and deenergizes the relay 92, in turn enabling the contacts $92c$ to open. The stepping switch in its 04 position puts the control unit 60 in circuit. As the armature $48a$ of the control unit 47 is progressively advanced into its coils, as described above, the armature $50a$ is withdrawn. This unit is in circuit with and controls the control unit 60 when the stepping switch is in its 04 position. The unit 60 is preset so as to impose a positive bias on the tubes when in circuit and the armature $50a$ is withdrawn, to once again render the tubes conducting.

The relay 46 acting through contacts $46b$ (FIG. 6) controls the grinder in the operation in which the grinding wheel is raised, enabling the beam 36 to swing under its spring biasing action in clockwise direction, forcing the armature 50a into the coils. The projection of this armature into its coils imposes a negative bias on the tubes and when this negative bias balances the positive bias of the control unit 60, the tube 96 is again shut off, deenergizing the relay 46, which completes the cycle and brings the circuit back to its starting position represented in FIG. 7.

The grinding machine 10 is provided with various controls for performing numerous operations. The apparatus of the present invention is adaptable to controlling various ones of those operations and in the present disclosed example the apparatus is utilized for controlling the depth of grinding by the grinding wheel. According to the inherent characteristics of the machine, the grinding wheel will make, for example, a number of passes over the workpiece, which may be any selected number. These passes may for example remove two one-thousandth inch of material at each pass and this range of the operation is under the control of the contacts 40b (FIG. 6). Then in a second range, the grinding wheel may make a number of passes over the workpiece and remove one-thousandth inch on each pass. This range is under the control of the contacts 42b (FIG. 6). A third range may be provided, in which the grinding wheel may make a number of passes and in this range remove one-half of one-thousandth inch in each pass, and this range is under the control of the contacts 44b (FIG. 6). Heretofore these contacts of FIG. 6 above mentioned were manually set so as to control the different ranges but there has not been a completely satisfactory automatic control thereof. The apparatus of the present invention performs this automatic control according to the setting of the control units 54, 56, 58, (lower, left). After each pass, the grinding wheel is lowered, which rocks the beam 36 a corresponding amount, and advances the armature 48a further into its coils, until the armature effects a negative bias of a value to shut off the tube 96, in the manner described, which is according to the setting of the unit 54, 56, 58 concerned as indicated by the pointer 78.

The scale 80 of the dial 76 (FIG. 5) is calibrated according to the depth of the cut to be made on the workpiece, or may be calibrated in other senses, as desired. For example the scale in the present instance is divided into 100 parts and the pointer 78 may be set according to a certain number of those parts, which in this instance would be a percentage. For example, in the first range of operation, it is desired to remove twenty ten-thousandths inch from the workpiece; the pointer of the first unit 54 would be set at 80, it being understood that one dial such as in FIG. 5 is provided for each of the control units 54, 56, 58, and 60. Then if it is desired to remove for example ten ten-thousandths in the second range of the grinder, the pointer of the second unit is set at the point 70; in a similar manner, the third unit 58 may be set according to any desired depth of removal of material in the third range, such as five ten-thousandths, when the pointer of the third unit would be set at 65. It will be understood that there may be a greater or lesser number of control units such as 54, 56, 58, than here represented. Thus the apparatus can control in infinitesmal increments, determined by the infinitesmal advancements of the armatures in the individual control units 54, 56, 58, 60.

The control unit 60 may be set at any desired value irrespective of the other units 54, 56, 58. It may be desired to limit the range of operation of the grinder in the final phase under the control of the unit 60, which in the example given above is raising the grinding wheel. This is done under the control of relay 46 and contacts 46b (FIG. 6). It may be desired to raise that wheel only a short distance above the final surface of the workpiece and in such case the unit 60 may be set to terminate that operation after only a very small range of movement, or alternatively it can be set for providing a large range.

The apparatus is operative for accurately controlling the range of movement of the grinding wheel according to the setting of any of the control units 54, 56, 58. According to the inherent characteristics of the grinder, the grinding wheel may be advanced an increment of any desired value, and it may be and often is advanced in a plurality of equal increments in any one setting, so as not to remove too much material in one pass. For example the power means 24 (FIG. 6) may have a setting for advancing the wheel in increments of two one-thousandth inch and it is desired to remove nine one-thousandth inch from the workpiece. The wheel is advanced in four increments of two one-thousandth inch each, under the control of the standard controls, referred to, of the grinding machine, but in the fifth advancement it is held to one one-thousandth thousandth inch by the control of the present invention because as the screw 22 (FIG. 1) turns to advance the wheel it advances the beam 36 in the traverse control 38; when that has been advanced only an increment corresponding to one one-thousandth inch the corresponding relay 40, 42, 44 will be energized and through the corresponding contacts of FIG. 6 the movement of the motor mechanism 24 will be terminated at the end of that one one-thousandth movement. It is believed unnecessary to enter into details of such an arrangement for terminating the action of the power means, since controls for that purpose may be any of various kinds and are characteristic of the nature of the grinder.

FIG. 8 represents diagrammatically the movement of the grinding wheel in the various ranges thereof as controlled by the apparatus of the invention. For example the top line 102a represents the starting or top position of the grinding wheel, and the line 102b the end of the first range, the space in between representing the extent of that range as controlled by the unit 54 and relay 40. The other lines 102c and 102d represent the other ranges under the control of the corresponding control units and relays as indicated. In return, the grinding wheel may be raised to any of various positions as represented by the several lines 102e, under the control of the control unit 60 and relay 46.

Provision is made for cancelling the control apparatus before the completion of a complete cycle thereof, if that should be desired. A return switch 104 (FIG. 7, upper, right) is in series with a relay 106 having a coil 106a and holding contacts 106b. This relay also closes contacts 106c in series with a cam actuated switch 108, (center right) a rectifier 110 and the secondary $84s_2$, the latter being thus connected across the rotor 88a of the stepping switch 88. The cam actuated switch 108 is actuated by the rotor 88a and in each position of the stepping switch the cam is positioned for closing its switch. Assuming that the operator wishes to immediately return the apparatus to zero or starting position after it has reached for example the 01 position, without completing its cycle, he closes the return switch 104 which effects closure of the contacts 106c and places the rotor 88a in circuit with the secondary $84s_2$, and the pulsating current thereby developed returns the rotor to its starting position and in such position the switch 108 will have been moved to open position. In the advancement of the stepping switch in returning to a starting position, the contacts 92c (upper, right) are opened upon energization of the relay 46 and actuation of the unlatching relay. Upon the unlatching relay 100 being actuated, the latching relay 92 is released, opening the contacts 92c, and returning the circuit to starting position.

I claim:

1. Electrical control apparatus for use with a machine having a regular internal law of operation, and including a tool for operating on a workpiece, means for so operating the tool, means for intermittently advancing the tool in a series of discrete steps through a range, and maintaining it in position between steps, the operating means being effective for performing an operation after each step while the advancing means is inactive, and thereby operative for so performing that operation effectively throughout the range, the advancing means including means for initiating the advancing movements, interrupting them, and again continuing them, to produce said steps, and finally terminating them at the end of the range, said control apparatus comprising:

a first control means including an inductance means which includes coil means and a core movable therein to vary the inductance in the coil means, the core being operatively connected with the advancing means and continuously progressively movable in a first and controlling direction in response to movement of the advancing means;

a plurality of second control means each including an inductance means which includes coil means and a core movable therein to vary the inductance in the respective coil means, the cores in the second control means being normally stationary but individually adjustable and individually operative for opposing the inductance of the first control means when the respective second control means is connected with the first control means, according to movement of the core in the first control means, the cores in the second control means being operative through their adjusted positions for predetermining the point of effective opposition of each second control means to the first control means, and when effectively opposing the first control means being operative for operating the interrupting means for thereby stopping the advancing means for predetermining said steps;

a third control means including inductance means which includes coil means and a core movable therein, the core being stationary but manually adjustable for opposing the inductance of the first control means, when the third control member is connected thereto, and the third control means being operative when it effectively opposes the first control means for operating the advancing means for terminating said range;

each inductance means including a single primary and single secondary, the core in the first inductance means is continuously movable throughout each step by the movement of the advancing means, and the inductance thereof is correspondingly continuously varied; and means for placing the second control means and the third control means successively in circuit with the first control means, the second control means and the third control means being operative independently of the advancing means according to the predetermined adjustment position of the respective ones of those control means.

2. Electrical control apparatus according to claim 1 wherein each inductance means includes a primary and a secondary coil, the primary coil of the first control means is in series with the primary coil of the respective second control means when the latter is connected with the first control means.

3. Electrical control apparatus according to claim 2 wherein the primary coil of the first control means is in series with the primary coil of the third control means when the latter is connected with the first control means.

4. Electrical control apparatus according to claim 2 wherein the primary coil of the first control means is in series with the primary coil of the third control means when the latter is connected with the first control means, said control apparatus comprising:

first control means including inductance means including a single primary coil, a single secondary coil, and a core movable relatively thereto, means for continuously progressively so moving the core in response to advancement of the tool and thereby continuously varying the inductance of the control means;

second control means including a plurality of inductance means each including a single primary coil, a single secondary coil, and a core movable relative thereto, means for connecting the inductance means of the second control means individually and successively with the inductance means of the first control means, and when so connecting them, connecting the respective primary coils in series and the secondary coils in series, the inductance means of the second control means thereby inductively opposing the inductance means of the first control means, the second control means also including means for individually and manually adjustably setting the cores relative to the respective coils, and thereby predetermining the point at which they effectively counteract the first control means;

third control means including inductance means including a single primary coil, a second single secondary coil, and a core movable relative thereto, means for connecting the inductance means of the third control means with the inductance means of the first control means and when so connecting them, connecting the respective primary coils in series and the secondary coils in series, the inductance means of the third control means thereby inductively opposing the inductance means of the first control means, the third control means also including means for manually adjustably setting the core relative to the coils, and thereby predetermining the point at which it effectively counteracts the first control means;

selector means for automatically controlling the connector means for successively connecting the second control means with the first control means, and the second control means thereby predetermining said steps; and selector means for automatically controlling the connector means for connecting the third control means with the first control means, and the third control means thereby terminating said range.